H. H. HARTUNG.
ANTISKIDDING DEVICE.
APPLICATION FILED JAN. 2, 1918.
1,293,424.
Patented Feb. 4, 1919.
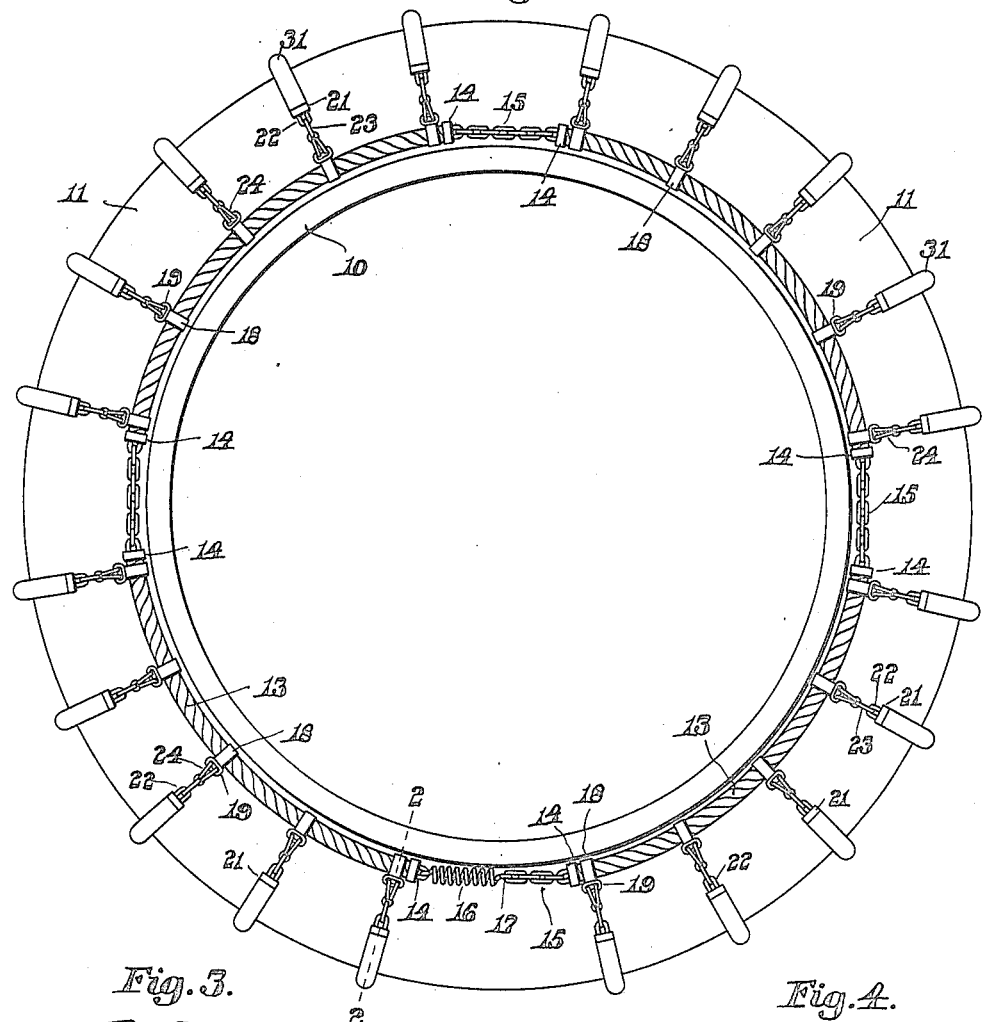
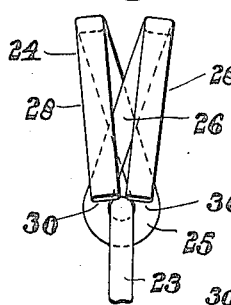
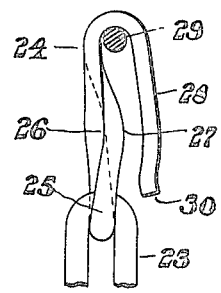
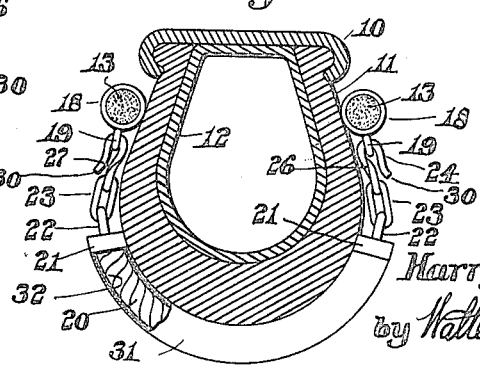
Inventor:
Harry H. Hartung.
by Walter E. Lombard
Atty.

UNITED STATES PATENT OFFICE.

HARRY H. HARTUNG, OF BOSTON, MASSACHUSETTS.

ANTISKIDDING DEVICE.

1,293,424.　　　　　Specification of Letters Patent.　　Patented Feb. 4, 1919.

Application filed January 2, 1918. Serial No. 211,307.

*To all whom it may concern:*

Be it known that I, HARRY H. HARTUNG, a citizen of the United States of America, and a resident of Boston, county of Suffolk, Commonwealth of Massachusetts, have invented certain new and useful Improvements in Antiskidding Devices, of which the following is a specification.

This invention relates to anti-skid devices for the wheels of motor vehicles and has for its object the production of a device of this character which may be attached to the tire without the tools which are required for the tire chains now in general use.

A further object of the invention is to so construct the device that it will remain in serviceable condition for an indefinite period by renewing certain parts subjected to wear by contact with the surface of the road.

The invention consists in providing the annular members on opposite sides of the tire with a plurality of eyes adapted to receive hooks on the ends of the cross member, extending over the tire, said hooks being so constructed that they may be engaged with said eyes without the use of tools and will be locked in engagement with said eyes by spring tongues preventing accidental displacement thereof.

The invention further consists in making the cross members of woven wire and protecting these cross members by inclosing each of them in a tube formed of woven fabric.

The invention further consists in certain novel features of construction and arrangement of parts which will be fully understood by reference to the description of the drawings and to the claims hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 1 represents an elevation of a tire having mounted thereon an anti-skid device embodying the principles of the present invention.

Fig. 2 represents a section of the tire and flexible side members on line 2, 2 on Fig. 1, said section being drawn to an enlarged scale, and showing the cross members partly in elevation and partly in section.

Fig. 3 represents a plan of one of the retaining hooks, and

Fig. 4 represents a side view of the same.

Similar characters designate like parts throughout the several figures of the drawings.

In the drawings, 10 is the rim of a vehicle wheel having mounted therein the shoe 11, within which is positioned the usual inner tube 12.

On opposite sides of the shoe 11 are annular members, consisting of sections 13 of wire. Each of these sections has secured to the opposite ends thereof, eyes 14, to which are connected short lengths of chain 15 which connect the various sections 13 together. Between one of the eyes 14 and one of the chains 15 is interposed a helical spring 16 which is adapted to take up the slack in said annular members. The free end of the helical spring 16 is provided with a hook 17 which may be inserted into any of the links of one of the chains 15, in order to diminsh the diameter of said annular members.

Each section 13 of wire has a plurality of collars 18 clamped thereon, each of said collars being provided with an outwardly extending eye 19.

A plurality of cross members 20 are provided which extend transversely over the tread surface of the shoe 11. These cross members 20 are preferably formed of wire as indicated in Fig. 3 of the drawings.

The opposite ends of the cross members 20 are provided with end members 21 having eyes 22 projecting therefrom. In each eye 22 is positioned a link 23, each link being provided with a spring hook 24 adapted for insertion into the eye 19 of one of the collars 18. These hooks 24 are preferably made as shown in Figs. 3 and 4 of the drawings, an eye 25 being formed at one end to receive the link 23 while the body portions thereof cross each other, as at 26, forming a hump 27 intermediate the ends of said hook.

The tongues 28 of the hook 24 extend toward the eye 25, and their inner faces are separated from the hump 27 a distance less than the diameter of the rounded portion 29 of the eyes 19. The hook is made of spring material, so that when it is desired to disengage the hook from the eye 19 the tongues 28 may be moved outwardly from the hump 27 sufficiently to permit the rounded portion 29 of the eye 19 to pass said hump.

The extreme ends 30 of the tongues 28 are spaced from the outer surface of the links 23 a distance slightly less than the diameter of the rounded portion 29 of the eyes 19, so that after said rounded portion 29 has passed between the hump 27 and the tongue 28, the said tongues 28 must be sprung outwardly again to permit the rounded portion 29 to pass between the link 23 and the extreme outer ends 30 of the tongues 28.

Owing to this double lock, when the hooks 24 are inserted into the eyes 19, accidental disengagement of said hooks is effectually prevented. When, however, a cross member becomes worn, and it is desired to replace the same the hooks may be disengaged from the eyes 19, by hand without the use of tools, the tongues 28 springing outwardly sufficiently to permit of such disengagement.

Each cross member 20 is confined within a tubular member 31 of woven fabric, having a lining 32 of rubber, or some similar material.

When the anti-skid device is in use the woven fabric of the tubular member 31 is the only surface thereof which comes into contact with the ground over which the vehicle is traveling. As this becomes worn the cross members may be disengaged, and the worn tubes 31 replaced with new ones. This prevents the cross members 20 from becoming worn and makes the anti-skid device serviceable for an unlimited time.

The rubber lining 32 of the tube 31 prevents the tube 31 from slipping upon the cross members 32 and as a portion of this tube of woven fabric 31 is in contact with the periphery of the shoe 11, it is obvious that the shoe is prevented from becoming worn as is the case where the cross members are made of chains or other metal members in direct contact with the shoe.

This construction of anti-skid device, with the flexible connectors 15 between the various sections 13 of the annular members, makes it possible to fold the device up into a small space when not in use. Owing to the manner in which the cross members may be readily connected to the sections 13 these members may be manually disengaged without the use of tools, which is a great advantage.

Heretofore the usual practice is to make the connection by means of hooks, which when inserted into the eyes of the annular members must be closed by means of heavy pliers, which are not always accessible when most needed.

In applicant's construction these pliers are not required.

The advantage of protecting the cross members by means of tubes of woven fabric is obvious. Even if these tubes should become worn to such an extent that the cross members 32 come into contact with the ground over which the vehicle is traveling, and the chauffeur neglects to replace the worn tubes with new ones, the cross members will be serviceable for a long time, even if some of the strands of the woven wire become worn.

The cross members 32 may be held in close contact with the tread surface of the tire by reducing the diameter of the annular members this reduction in diameter being accomplished by varying the position of the hook 17 in the various links of the chains 15.

It is believed that the operation and many advantages of this invention will be fully understood by the foregoing description.

Having thus described my invention, I claim:

1. In a device of the class described, flexible members on opposite sides of the tire, each consisting of a plurality of sections of cable; eyes secured to the opposite ends of said sections; cross members connected to said sections and extending over the tire; a chain connection between the adjacent eyes of each pair of sections; and means coacting with one of said chain connections for taking up the slack in said flexible member.

2. In a device of the class described, flexible members on opposite sides of the tire, each consisting of a plurality of sections of cable; eyes secured to the opposite ends of said section; cross members connected to said sections and extending over the tire; a chain connection between the adjacent eyes of each pair of sections; and a helical spring in one of said chain connections.

3. In a device of the class described, annular members on opposite sides of the tire; cross members connected thereto extending over the tire; and a continuous imperforate protecting tube inclosing each of said cross members and independent thereof.

4. In a device of the class described, annular members on opposite sides of the tire; cross members detachably connected thereto and extending over the tire; and a continuous imperforate protecting tube inclosing each of said cross members and removable therefrom.

5. In a device of the class described, annular members on opposite sides of the tire; cross members of wire connected thereto and extending over the tire; and a protecting tube inclosing each cross member formed of woven fabric.

6. In a device of the class described, annular members on opposite sides of the tire; cross members of wire connected thereto and extending over the tire; and a protecting tube inclosing each cross member formed of woven fabric, with a lining of rubber.

Signed by me at Boston, Mass., this 17th day of December 1917.

HARRY H. HARTUNG.

Witnesses:
WALTER E. LOMBARD,
NATHAN C. LOMBARD.